United States Patent [19]

Ball et al.

[11] 3,884,482
[45] May 20, 1975

[54] COOLED SEAL CARTRIDGE

[75] Inventors: Rowland E. Ball, Long Beach;
Winfred J. Wiese, Whittier, both of Calif.

[73] Assignee: Borg-Warner Corporation, Chicago, Ill.

[22] Filed: Mar. 8, 1973

[21] Appl. No.: 338,807

[52] U.S. Cl. .................. 277/17; 277/22; 277/41
[51] Int. Cl. ............................................. F16j 15/40
[58] Field of Search .................. 277/3, 16, 22, 17

[56] References Cited
UNITED STATES PATENTS

| | | | |
|---|---|---|---|
| 2,494,887 | 1/1950 | Lenhart | 277/22 |
| 3,459,430 | 8/1969 | Ball | 277/3 |
| 3,489,419 | 1/1970 | Stratienko | 277/22 X |
| 3,600,101 | 8/1971 | Oglesby | 277/16 |
| 3,667,766 | 6/1972 | Sussmeyer | 277/22 |
| 3,746,350 | 7/1973 | Mayer | 277/96 |

OTHER PUBLICATIONS

Drawing IF6235, Seal and Bearing Assembly, by Ball, November 1968.

*Primary Examiner*—Samuel B. Rothberg
*Attorney, Agent, or Firm*—John O. Evans, Jr.

[57] ABSTRACT

A cooled seal cartridge assembly applicable to a pump as a unit and containing a stub shaft, a double mechanical seal and a heat exchanger through which cooling fluid is circulated by an axial flow impeller which carries the rotatable carbon rings of the mechanical seals, and a fan circulates air over the heat exchanger.

13 Claims, 2 Drawing Figures

COOLED SEAL CARTRIDGE

BACKGROUND OF THE INVENTION

The provision of a mechanical seal assembly for preventing leakage along a rotary shaft extending into or through a housing, such as a pump housing, has involved the utilization of double and tandem seals, each including a pair of complemental relatively rotatable seal rings respectively carried by the housing and the shaft through suitable mounting means. Where high temperature fluids are encountered, the seal assembly, and more particularly the seal rings may be cooled by a coolant fluid circulated through the seal chamber and through a surrounding heat exchanger. To assist in cooling, the heat exchanger may be exposed externally of the housing or may be subjected to air flow induced by a fan rotatable with the shaft.

However, such assemblies are, in general composed of sub-assemblies and components which require substantial work to assemble and disassemble the seal and cooling components, notwithstanding the existence of certain cartridges or seal assemblies which are susceptible of preliminary assembly and subsequent installation in the seal chamber of the housing as a unit.

SUMMARY OF THE INVENTION

The present invention involves and has as an object the provision of an improved cartridge or mechanical seal assembly which can be more readily and easily installed on a pump shaft, without entailing complex and time consuming disassembly and assembly procedures.

The cartridge of the invention is adapted to be completely assembled outside of a pump or other device having a rotary shaft, and installed as a unit containing a stub shaft connectable to the rotary shaft, a pair of mechanical seal sub-assemblies each including a pair of relatively rotatable seal rings, one of the rings of each pair being rotatable with the stub shaft and the other ring being non-rotatably connected to a housing which defines the seal chamber and through which the cooling fluid is circulated by an axial flow impeller rotatable with the stub shaft and driving the respective rotatable seal rings, whereby fluid friction and heat are minimized, and the housing has removably disposed thereon a heat exchanger jacket, which is separately replaceable without disassembly of the cartridge from the pump shaft. A fan for forcing cooling air over the heat exchanger jacket and a fan shroud are adapted to be installed on the stub shaft and the jacket. The mechanical sealing structure includes sub-assemblies of a seal ring and pre-loading springs that are initially held in condition for assembly in the seal housing by novel retainer means.

The cartridge seal of the invention is well suited to installation in the usual intermediate support or housing between a pump case and pump drive motor through an access opening or window, without requiring disassembly of the motor assembly from the pump assembly. The intermediate housing is adapted to support a reservoir for the cooling fluid, the reservoir having conduits adapted to be easily connected to and disconnected from the seal cartridge housing during assembly and disassembly of the cartridge unit between and from between the motor shaft and rotary shaft to be sealed.

The present invention possesses many other advantages, and has other purposes which may be made more clearly apparent from a consideration of forms in which it may be embodied. These forms are shown in the drawings accompanying and forming part of the present specification. They will now be described in detail, for the purpose of illustrating the general principles of the invention; but it is to be understood that such detailed descriptions are not to be taken in a limiting sense, since the scope of the invention is best defined by the appended claims.

DESCRIPTION OF THE PREFERRED EMBODIMENT

Figure 1:
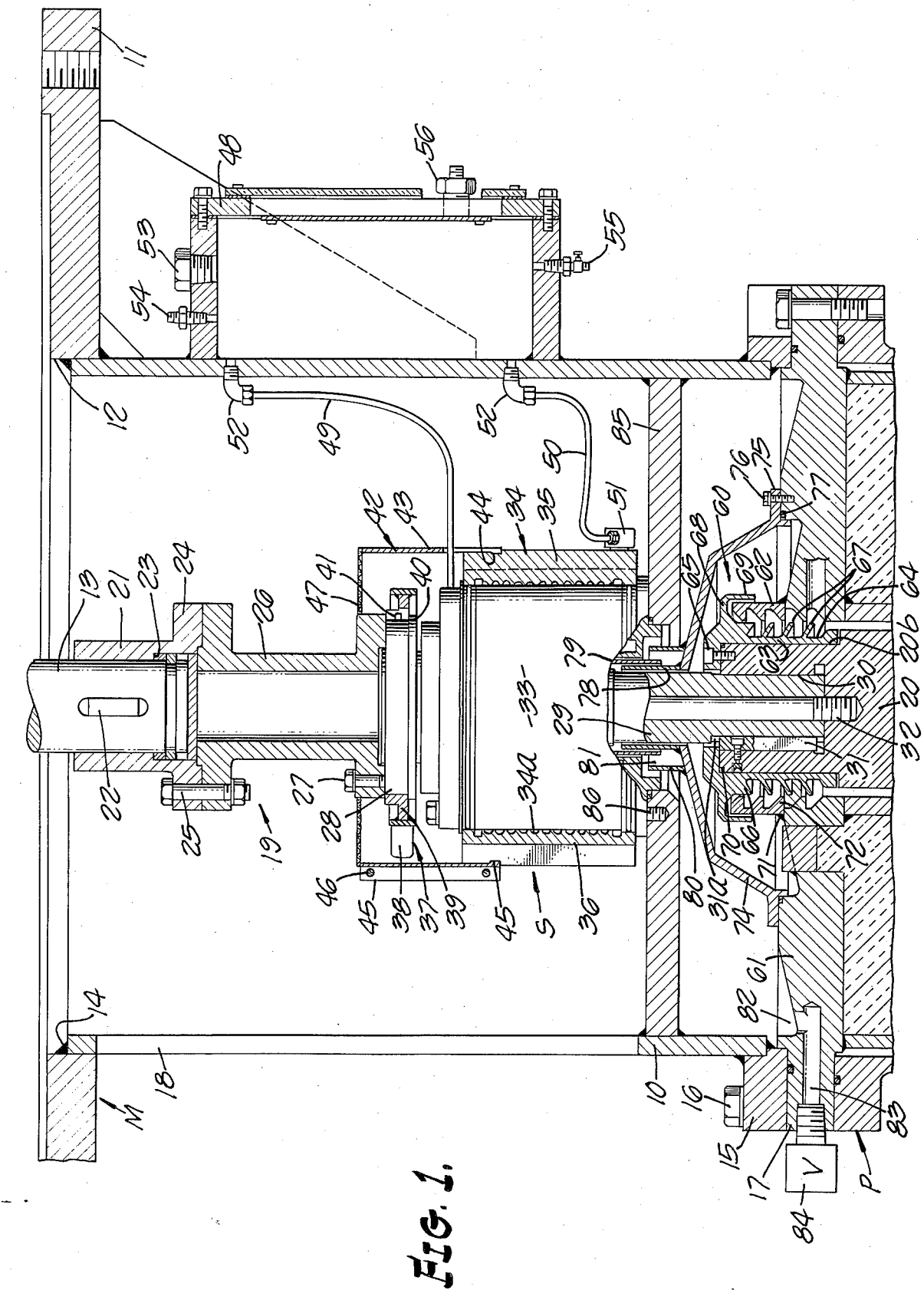
FIG. 1 is a view partly in longitudinal section and partly in elevation, illustrating a cooled mechanical seal cartridge installed between a pump shaft and a motor shaft.

As seen in the drawings, referring first to FIG. 1, the seal cartridge S is interposed between a motor housing M and a pump housing P in an elongated intermediate housing 10 or other structure located between the motor housing M and the pump housing P which connects the housings M and P together in spaced relation. In the illustrated structure, the motor housing M has an end flange 11 providing an opening 12 through which an end 13 of a motor shaft projects. The intermediate housing or support 10 comprises a cylindrical or other tubular body suitably welded at 14 in the opening 12 to the plate 11 and having at its other end a flange 15 adapted to be connected by fasteners 16 to an end plate 17 of the pump assembly P. At one side, the intermediate housing or support 10 is open, as by the provision of a window 18 which provides access to the seal cartridge assembly S and to connector means 19 by which the motor shaft 13 is adapted to drive the rotary pump shaft 20.

This connector means 19 comprises a connector sleeve 21 keyed by a key 22 on the motor shaft 13 and having an internal shoulder 23 for limiting downward movement of the sleeve 21 on the shaft 13, but the sleeve 21 being free for axial upward movement on the shaft 13. On the sleeve 21 is a connector flange 24 connectable by fasteners 25 to a coupling 26 which is in turn connected by fasteners 27 to an upper flange 28 formed on or made a part of a stub shaft 29 which forms part of the seal cartridge S and which extends into a socket 30 in the upper end of the pump shaft 20, wherein the stub shaft 29 is connected to the pump shaft for rotation as a unit by an axially extended key 31 engaging in a keyway 31a on the stub shaft 29. The stub shaft 29 has a bolt 32 extending axially therethrough and threaded with the pump shaft 20 to releasably hold the stub shaft and the pump shaft against axial separation, as will be later described.

The seal cartridge S comprises a cylindrical body 33, adapted to contain the mechanical seal means hereinafter to be described, and about which is disposed a tubular jacket 34 defining with the body 33 a helical flow passage 34a for cooling fluid which is circulated through the seal assembly, as will also be later described. To assist in cooling the jacket 34 it is provided with radiating ribs 35 and longitudinally extended grooves 36 through which air is forced by a fan 37. This fan 37 has blades 38 carried by a support ring 39 which rests on a radially outwardly projecting flange 40 on the stub shaft flange 28, the ring being keyed to the flange 28, as at 41, for rotation therewith and being retained in place upon connection of the coupling sleeve 26 to the stub shaft flange 28 by the fasteners 27. A shroud 42 is provided about the fan 37 by a longitudinally split body 43 having a lower, inwardly projecting shoulder 44 adapted to engage in an external groove 45 in the ribs 35 of the jacket 34 when the split shroud is disposed about the jacket and removably secured in place by radially outwardly projecting flanges 45 and fasteners 46 which provide a clamping means. At its upper end the shroud may be provided with a suitable screen 47.

Cooling fluid is adapted to be supplied to the seal body 33 from a reservoir 48 suitably made a part of or connected to the intermediate member 10, or otherwise conveniently located. Conduits 49 and 50 lead between the reservoir and suitable fittings, such as the fitting 51 on the seal body 33 and connectors 52 at the reservoir. The reservoir may be appropriately provided with suitable fill and bleed fittings 53 and 54, and a drain fitting 55, as well as with a pressurizing fitting or valve 56, whereby the cooling fluid may be pressurized as desired, depending upon the conditions under which the mechanical sealing means are to be operated.

Ordinarily, the pressure of the cooling fluid would be set at a value somewhat in excess of the pressure of the fluid in the pump case P, so that any leakage through the seal assembly S results in cooling fluid passing along the stub shaft 29, rather than in the loss of fluid from the pump case.

By way of example, the seal assembly is shown as applied to a pump assembly of the type which may pump high temperature liquid, but wherein a blanket of gas may be provided between the pump liquid and the seal assembly S. In this illustrative structure, which generally corresponds to that shown in U.S. Pat. No. 3,630,529, granted Dec. 28, 1971, a vapor trap designated by the general reference numeral 60 is interposed between the shaft 20 and a head plate 61 of the pump case P for the purpose of substantially preventing the escape of vapor along the shaft 20 and across the head. The vapor trap has a stationary member 62 carried by the head 61 and a rotary member 63 carried by the shaft 20.

The rotary member 63 has a cylindrical portion 64 fitted to the shaft section 20b. The rotary member 63 is locked to the shaft section by a screw 65. A cylindrical section 66 of the rotary member 63 carries axially spaced, outwardly projecting, downwardly sloping baffles in the form of fins 67, sloped downwardly at an angle at approximately 30° from the horizontal. The rotary member 63 has a cap portion 68 with a depending skirt 69. The cap overlies the stationary member 62 and is spaced slightly therefrom so that it may rotate freely without interference. An O-ring 70 seals the rotary member to the shaft section 20.

The stationary member 62 of the trap is welded to the pump head 61 at 71 and has a plurality of inwardly projecting baffle members 72 positioned opposite to the spaces between the fins 67 on the rotary member. The inner diameters of the baffle members 72 are slightly greater than the outer diameters of the fins 67 of the rotary member; this enables the rotary member to be inserted into and removed from the stationary member.

Above the trap 60 is a domed member 74 which is connected at its outer peripheral flange 75, by fasteners 76, to the head plate 61, a suitable ring seal 77 being interposed between the flange and the plate. At the top of the domed member 74 is a tubular member 78 which is disposed about the stub shaft 29 in circumferentially spaced relation to another tubular member 79 which, as will later be described, forms part of the seal assembly S. A third tubular member 80 projects upwardly from the domed member 74 in outwardly, radially spaced relation to the tubular member 78 and forms with the latter an annular well 81 into which the lower end of the tubular member 79 extends. The height of the outermost tubular body 80 is less than the height of the innermost tubular body 78, whereby cooling fluid which leaks through the seal assembly will predominantly flow over the outermost tubular body 80 and thence to a low groove 82 in the plate 61 from which the cooling fluid may be periodically drained through a drain passage 83 normally closed by a suitable valve 84.

Above the upper pump plate 61 the intermediate support structure 10 has a horizontal member 85, shown as a plate, provided with a central opening in which the seal assembly S is mounted by bolts 86. This seal assembly S is shown in detail in FIG. 2.

The body 33 of the seal assembly S is of cylindrical form and has an upper end flange 90 and a lower end flange 91, respectively secured to the ends of the body 33 by fasteners 92 and 93. A ring seal 94 is disposed between the top plate 90 and the upper end of the body 33, and a ring seal 95 is disposed between the lower end of the body 33 and the flange 91.

The top flange 90 has an inner, cylindrical sleeve section 97, in which is disposed non-rotatable sealing ring means 98, including a ring 99 having a radial seal face 100, the ring 99 being sealed on the sleeve section 97 by the usual packing ring 101 which is expanded by an expander and drive ring 102. The expander and drive ring 102 is suitably keyed to the seal ring 99, as by co-engageable lugs at 103, and the ring 102 is also suitably keyed, as by lugs and ribs at 104, to a retainer ring 105, which is in turn secured by fasteners 106 to the top flange 90. A number of coiled compression springs 102a are disposed between the top flange 90 and the expander and drive ring 102 and normally bias the non-rotatable sealing ring 99 axially away from the end flange 90.

In order to enable the sealing ring means 98 to be initially installed as a sub-assembly on the end flange 90, before the latter is secured to the body 33, the retainer ring 105 has a radially inturned flange 105a constituting an abutment engageable by an outstanding abutment 99a on the seal ring 99, whereby expansion of the springs 102a is limited and the seal ring 99 is retained on the skirt section 97 of the end flange 90.

The lower end flange 91 corresponds to the upper flange 90 and has a skirt 197 on which non-rotatable sealing ring means 198 are disposed, including the seal ring 199 with a radial seal face 200, the packing 201, the expander and drive ring 202 which is keyed to the seal ring 199 and to a retainer 205 which is secured to the flange 91 by fasteners 206 and initially holds the compression springs 202a and seal ring 199. This lower non-rotatable sealing means will, accordingly, be understood to provide a sub-assembly with the lower flange 91 in the same manner as described above with respect to the upper non-rotatable sealing ring means 98, without need for further detailed description.

Between the opposed radial seal faces 100 and 200 of the non-rotatable sealing ring means 98 and 198 are rotatable sealing ring means 110, providing a radial seal face 111 opposed to the radial seal face 100 of the seal ring 99 and a radial seal face 112, opposed to the radial seal face 200 of the seal ring 199. These seal faces 111 and 112 are formed on rotatable seal rings, such as carbon rings, 113 and 114, respectively, carried in bores 115 and 116 in a common carrier ring 117 which is keyed at 118 to the shaft 29 and held against a radial shoulder 119 by a threaded collar 120 engaged with companion threads 121 on a reduced stub shaft section 122. Static ring seals 122a are disposed between the seal rings 113 and 114 and the carrier 117 in the bores 115 and 116 to prevent fluid from passing around the seal rings 113 and 114.

In the illustrative embodiment the collar 120 is locked in place by a set screw 123 which engages in a groove 124 in the stub shaft 29. In addition, the tubular member 79 previously described is formed as a part of the collar 120 for simplicity of construction.

As will now be apparent, the housing or body 33 and its end flanges 90 and 91 cooperate with the stub shaft 29 to form a chamber for the mechanical sealing ring means comprising the opposed non-rotatable sealing ring means 99 and 199 and the intermediate rotatable sealing ring means 110. In addition the mechanical sealing ring means define with the housing 33 a cooling fluid chamber 125 which is in communication at its opposite ends, via ports 125a and 125b, with annular spaces 126 and 127 which in turn communicate with the helical flow passage 34a within the heat exchanger sleeve 34. Cooling fluid is supplied to the chamber 125 from the reservoir, as previously described via the conduits 49 and 50, the latter communicating with the annular space 127 and the former communicating with the chamber 125 via porting 125c in the end flange 90.

Figure 2:
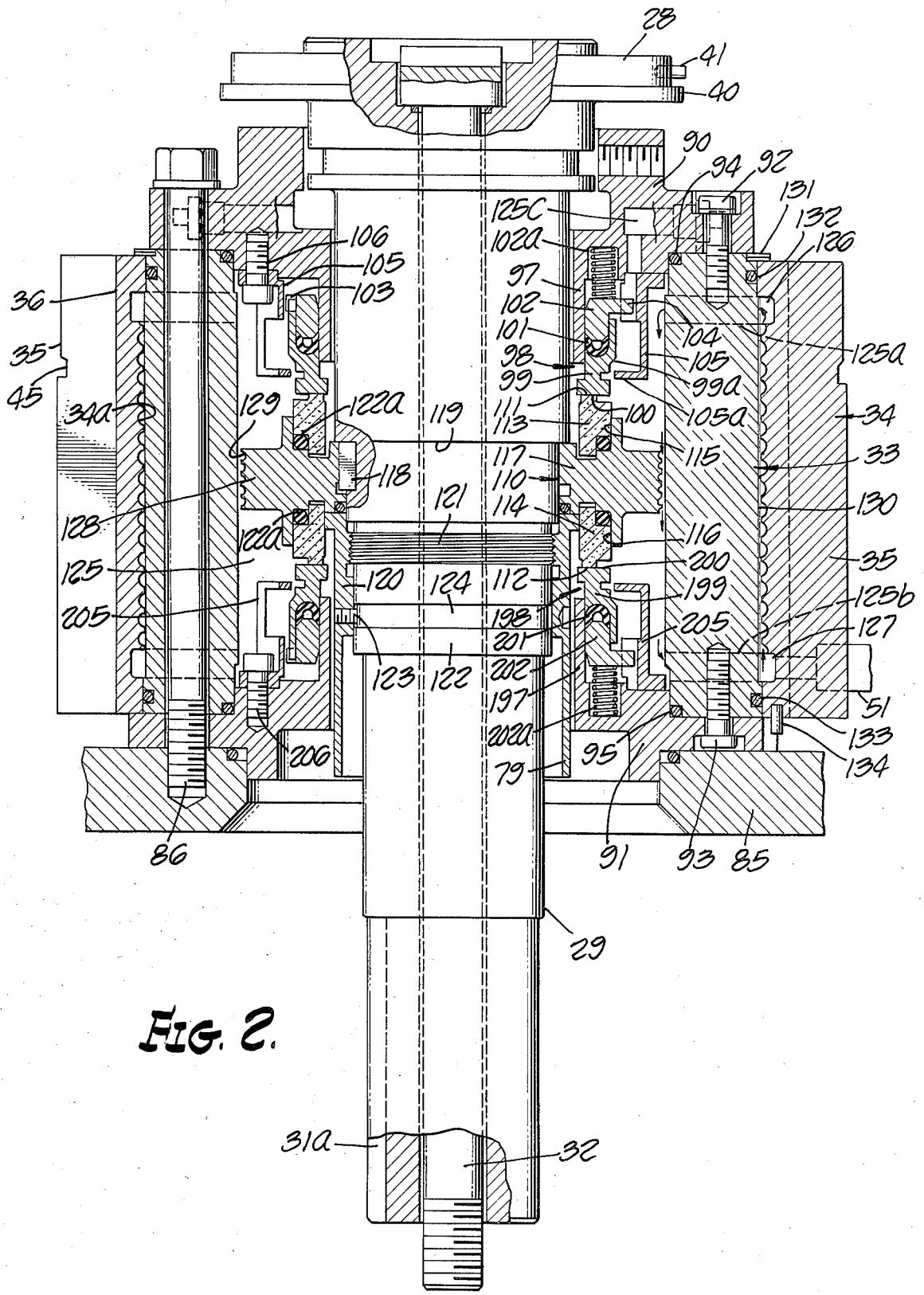
FIG. 2 is a longitudinal section through the cartridge assembly, on an enlarged scale, showing its mounting on the pump case, with the stub shaft shown partially in elevation and partially in broken section.

In the present embodiment, cooling fluid is circulated through the cooling fluid chamber 125, as shown by the arrows in FIG. 2, by an axial flow impeller 128 formed as part of the rotatable ring carrier 117 which has an outer peripheral helical ridge 129 to induce flow. Since the rotatable sealing ring means 110 is a simple structure and the relatively complex structures of the sealing ring means 98 and 198 remain non-rotatable, the heat of fluid friction is minimized.

The cooling jacket 34 is applicable to and removable from the body 33 in an endwise manner. To enable this, the body has a cylindrical outer wall 130 over which the jacket 34 fits, and a lock ring 131 engaged beneath the top flange 90 retains the jacket 34 in place. Seal rings 132 and 133 are disposed between the body 33 and cylindrical inner walls at the top and bottom of the jacket 34. If desired, the jacket and body may be pinned, as at 134 to prevent the jacket from rotating on the body.

In the assembly of the seal assembly S, the upper flange 90, with the non-rotatable sealing ring means 98 retained thereon by the retainer 105, is placed endwise over the lower end of the stub shaft 29, and, then, the rotatable sealing ring means 110 is applied to the shaft and secured in place by the collar 120. Thereafter, the body 33, with or without the cooling jacket is assembled endwise, over the lower end of the stub shaft 29 and the sealing ring means 98 and 110, and fastened to the top flange 90. The lower end flange 91, with the non-rotatable sealing ring means 198 retained thereon, as above described, is then applied over the lower end of the shaft 29 and connected to the body 33. If the jacket 34 was not previously applied to the body 33, this is then done to complete the cartridge assembly as seen in FIG. 2, which can then be assembled with the pump shaft 20 and the support structure 10 by the through bolts 32 and 86.

This assembly of the seal cartridge S with the pump shaft can be accomplished through the side opening 18 in the intermediate support structure 10, in the absence of the coupling sleeve 26. The fan 37 and the shroud 42 can then be applied. Thereafter the coupling 19 can be completed to interconnect the motor shaft 13 with the stub of the seal cartridge.

A reverse dis-assembly procedure is also possible, and therefore, the present invention provides for rapid installation, service, replacement or repair of the seal assembly S.

We claim:

1. A seal assembly applicable to a rotary shaft to prevent fluid leakage between said rotary shaft and a case comprising: a housing having means for mounting the housing on said case, a stub shaft rotatable in said housing and having means connectable to said rotary shaft, said housing including means defining a seal chamber between said housing and said stub shaft, mechanical seal means in said chamber for preventing fluid leakage between said stub shaft and said housing, said mechanical seal means forming with said housing a cooling fluid chamber, said housing having an inlet for said cooling fluid chamber and an outlet for said cooling fluid chamber, a cooling jacket disposed about said housing and having means providing a flow path therein for cooling fluid flow, means connecting one end of said flow path to said inlet and means connecting the other end of said flow path to said outlet, whereby cooling fluid may flow from said outlet through said flow path, through said inlet, and through said cooling fluid chamber from said inlet to said outlet, and cooling fluid impelling means rotatable with said stub shaft for causing cooling fluid flow through said cooling fluid chamber from said inlet to said outlet, wherein said housing has a cylindrical outer surface, said cooling jacket being in the form of a sleeve applicable endwise to said housing, said housing and said sleeve having means forming end seals therebetween, and one of said housing and said cooling jacket having groove means in its surface between said end seals and confronted by the other of said cooling jacket and said sleeve, said groove means providing said flow path for cooling fluid flow.

2. A seal assembly as defined in claim 1, including air fan means carried by said stub shaft for forcing air over said cooling jacket.

3. A seal assembly as defined in claim 1, including air fan means carried by said stub shaft for forcing air over said cooling jacket, and shroud means for said fan carried by said jacket.

4. A seal assembly as defined in claim 1, including air fan means removably carried by said stub shaft, and shroud means for said fan removably carried by said cooling jacket.

5. A seal assembly as defined in claim 1, wherein said means connectable to said rotary shaft comprises a bolt extending through said stub shaft and key means on said stub shaft.

6. A seal assembly as defined in claim 1, including means releasably retaining said jacket on said housing.

7. A seal assembly as defined in claim 1, including means defining an external cooling fluid reservoir and means for connecting said reservoir to said flow path for cooling fluid flow.

8. A seal assembly as defined in claim 1, said means defining a seal chamber comprising end flanges removably secured on said housing, and said means for mounting said housing on said case including fastener means removably connecting said housing to said case, whereby said housing, said end flanges and said jacket are removable from said case as a unit.

9. A seal assembly as defined in claim 8, said means defining a seal chamber comprising end flanges removably secured on said housing, and said means for mounting said housing on said case including fastener means removably connecting said housing to said case, said mechanical seal means comprising non-rotatable and axially shiftable seal ring carried by said end flanges, and each of said seal rings having a radially extended face, and a pair of rotatable seal rings carried by said cooling fluid impelling means and each having a radial face opposed by the radial face of the respective non-rotatable seal rings.

10. A seal assembly as defined in claim 9, including compression spring means interposed between said end plates and said non-rotatable seal rings and expansible to bias the latter towards said rotatable seal ring, and retainer means carried by said end plates, said non-rotatable seal rings and said retainer means having abutment means for limiting expansion of said spring means during assembly.

11. A seal assembly as defined in claim 8, said mechanical seal means comprising non-rotatable and axially shiftable seal rings carried by said end flanges, each of said seal rings having a radially extended face, and rotatable seal ring means carried by said stub shaft for rotation therewith and having radial faces opposed by the radial faces of the respective non-rotatable seal rings.

12. A mechanical seal cartridge comprising: a rotatable stub shaft, a hollow housing disposed about said stub shaft, end flanges disposed about said stub shaft, means releasably connecting said end flanges to said housing, each of said end flanges carrying non-rotatable sealing ring means including an axially shiftable seal ring having a radial seal face, the radial seal face of the respective seal rings being disposed in opposing axially spaced relation, rotatable sealing ring means carried by said stub shaft for rotation therewith and providing oppositely facing radial seal faces for engagement by said radial seal faces of the respective axially shiftable seal rings, and spring means interposed between said end flanges and said axially shiftable seal rings for biasing the latter towards said rotatable sealing ring means to effect said engagement of said radial seal faces, and including a cooling jacket disposed about said housing and having means defining a cooling fluid flow path therein, said housing having a pair of axially spaced ports leading between said cooling fluid flow path and the interior of said housing, said cooling fluid flow path, said pair of spaced ports, and said interior of said housing defining a fluid flow circuit wherein fluid may flow from said interior of said housing, through one of said pair of ports, through said cooling fluid flow path, through the other of said pair of ports, and back into said interior of said housing, and said rotatable sealing ring means including cooling fluid impelling means.

13. A mechanical seal cartridge comprising: a rotatable stub shaft, a hollow housing disposed about said stub shaft, end flanges disposed about said stub shaft, means releasably connecting said end flanges to said housing, each of said end flanges carrying non-rotatable sealing ring means including an axially shiftable seal ring having a radial seal face, the radial seal face of the respective seal rings being disposed in opposing axially spaced relation, rotatable sealing ring means carried by said stub shaft for rotation therewith and providing oppositely facing radial seal faces for engagement by said radial seal faces of the respective axially shiftable seal rings, and spring means interposed between said end flanges and said axially shiftable seal rings for biasing the latter towards said rotatable sealing rings means to effect said engagement of said radial seal faces, a cooling jacket disposed about said housing and having means defining a cooling fluid flow path therein, said housing having a pair of axially spaced ports leading between said cooling fluid flow path and the interior of said housing, said cooling fluid flow path, said pair of spaced ports, and said interior of said housing defining a fluid flow circuit wherein fluid may flow from said interior of said housing, through one of said pair of ports, through said cooling fluid flow path, through the other of said pair of ports, and back into said interior of said housing, and said rotatable sealing ring means including cooling fluid impelling means, said rotatable sealing ring means comprising a carrier ring mounted on said stub shaft, said carrier ring having oppositely opening axial bores, seal rings in said bores having said radial seal faces thereon, and static sealing means between said seal rings in said bores and said carrier ring.

* * * * *